United States Patent
Nishizaki et al.

(10) Patent No.: US 10,361,452 B2
(45) Date of Patent: Jul. 23, 2019

(54) GARNET-TYPE OXIDE SINTERED BODY AND METHOD FOR PRODUCING SAME

(71) Applicant: Central Glass Company, Limited, Ube-shi, Yamaguchi (JP)

(72) Inventors: Tsutomu Nishizaki, Ube (JP); Ryota Esaki, Ube (JP); Tetsuya Tamura, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 37 days.

(21) Appl. No.: 15/579,687

(22) PCT Filed: Jul. 13, 2016

(86) PCT No.: PCT/JP2016/070655
§ 371 (c)(1),
(2) Date: Dec. 5, 2017

(87) PCT Pub. No.: WO2017/018217
PCT Pub. Date: Feb. 2, 2017

(65) Prior Publication Data
US 2018/0175446 A1    Jun. 21, 2018

(30) Foreign Application Priority Data
Jul. 29, 2015  (JP) .................... 2015-149486

(51) Int. Cl.
*H01M 8/04*   (2016.01)
*H01M 10/0562*   (2010.01)
(Continued)

(52) U.S. Cl.
CPC ...... *H01M 10/0562* (2013.01); *C01G 25/006* (2013.01); *C04B 35/481* (2013.01);
(Continued)

(58) Field of Classification Search
CPC .................................................. H01M 8/04
See application file for complete search history.

(56) References Cited

U.S. PATENT DOCUMENTS

| | | | |
|---|---|---|---|
| 2010/0203383 A1 | 8/2010 | Weppner | |
| 2013/0084505 A1 | 4/2013 | Iriyama et al. | |

(Continued)

FOREIGN PATENT DOCUMENTS

| | | |
|---|---|---|
| JP | 2010-534383 A | 11/2010 |
| JP | 2012-18792 A | 1/2012 |

(Continued)

OTHER PUBLICATIONS

International Search Report (PCT/ISA/210) issued in PCT Application No. PCT/JP2016/070655 dated Aug. 16, 2016 with English translation (Four (4) pages).

(Continued)

*Primary Examiner* — Jacob B Marks
(74) *Attorney, Agent, or Firm* — Crowell & Moring LLP

(57) ABSTRACT

A garnet-type oxide sintered body according to the present invention includes crystal grains composed of a garnet-type oxide containing Li, La and Zr and a grain boundary composition containing boron and silicon and filling gaps between the crystal grains. The oxide sintered body has the characteristics of high density and high ion conductivity. A production method of the sintered body includes a step of providing a precursor material by mixing a garnet-type oxide powder containing Li, La and Zr with a sintering aid; a step of forming the precursor material into a formed body; and a sintering step of sintering the formed body. The sintering aid contains oxygen, boron, silicon and lithium. The oxygen and boron, or the oxygen and silicon, contained in the sintered aid form a compound.

18 Claims, 6 Drawing Sheets

(51) Int. Cl.
  *C04B 35/48* (2006.01)
  *C04B 35/626* (2006.01)
  *C04B 35/63* (2006.01)
  *C04B 35/64* (2006.01)
  *C01G 25/00* (2006.01)
  *H01B 1/08* (2006.01)
  *C04B 35/486* (2006.01)
  *H01M 10/0525* (2010.01)

(52) U.S. Cl.
  CPC ........ *C04B 35/486* (2013.01); *C04B 35/6262* (2013.01); *C04B 35/6264* (2013.01); *C04B 35/6268* (2013.01); *C04B 35/62645* (2013.01); *C04B 35/62675* (2013.01); *C04B 35/6303* (2013.01); *C04B 35/64* (2013.01); *H01B 1/08* (2013.01); *H01M 10/0525* (2013.01); *C01P 2002/30* (2013.01); *C01P 2002/72* (2013.01); *C01P 2004/03* (2013.01); *C01P 2006/40* (2013.01); *C04B 2235/3203* (2013.01); *C04B 2235/3217* (2013.01); *C04B 2235/3222* (2013.01); *C04B 2235/3227* (2013.01); *C04B 2235/3248* (2013.01); *C04B 2235/3409* (2013.01); *C04B 2235/3427* (2013.01); *C04B 2235/656* (2013.01); *C04B 2235/6567* (2013.01); *C04B 2235/764* (2013.01); *C04B 2235/77* (2013.01); *C04B 2235/85* (2013.01); *C04B 2235/96* (2013.01)

(56) References Cited

U.S. PATENT DOCUMENTS

| | | | |
|---|---|---|---|
| 2013/0230778 A1* | 9/2013 | Saimen | H01M 10/056 429/303 |
| 2014/0205910 A1 | 7/2014 | Weppner et al. | |
| 2015/0056519 A1 | 2/2015 | Ohta et al. | |

FOREIGN PATENT DOCUMENTS

| | | |
|---|---|---|
| JP | 2013-32259 A | 2/2013 |
| JP | 2013-37992 A | 2/2013 |
| JP | 2013-107779 A | 6/2013 |
| JP | 2013-134852 A | 7/2013 |
| JP | 2013-184848 A | 9/2013 |
| JP | 5634865 B2 | 12/2014 |
| JP | 2015-41573 A | 3/2015 |
| WO | WO 2013/175993 A1 | 11/2013 |

OTHER PUBLICATIONS

Japanese-language Written Opinion (PCT/ISA/237) issued in PCT Application No. PCT/JP2016/070655 dated Aug. 16, 2016 (Three (3) pages).

Tadanaga, et al., "Low Temperature Synthesis of Highly Iron Conductive $Li_7La_3Zr_2O_{12}$—$Li_3BO_3$ Composites," Electrochemistry Communications, 33 (2013) pp. 51-54 (Four (4) pages).

\* cited by examiner

GARNET-TYPE OXIDE SINTERED BODY AND METHOD FOR PRODUCING SAME

FIELD OF THE INVENTION

The present invention relates to a garnet-type oxide sintered body and a method for producing the sintered body. More particularly, the present invention relates to a garnet-type oxide sintered body usable as a solid electrolyte for an all-solid-state lithium ion secondary battery etc. and a method for producing the sintered body.

BACKGROUND ART

Secondary batteries are used as power storage devices for portable equipment such as mobile phones and notebook personal computers, transport equipment such as automobiles and aircrafts, power leveling applications and the like. In either of these applications, it has been demanded to improve the energy density of the secondary batteries. At present, the energy density of lithium ion batteries is the highest among practical secondary batteries. Studies have been made to further improve the energy density of the lithium ion batteries while maintaining the safety of the lithium ion batteries. In part of such studies, all-solid-state batteries (each using a solid electrolyte in place of an electrolytic solution) are being studied as improvements of the lithium ion batteries.

The all-solid-state battery has a serial structure where negative electrode layers, solid electrolyte layers and positive electrode layers are repeatedly stacked together without using cupper wires etc. because all of battery component materials such as negative electrode material, solid electrolyte and positive electrode material are solid. The all-solid-state batteries are hence considered as being suitable for automotive applications and power storage applications. In particular, the all-solid-state oxide-based batteries in which negative electrode active material, solid electrolyte and positive electrode active material are each solid are expected to be effective in terms of improvement in safety and high-temperature durability in addition to improvement in energy density.

A garnet-type oxide $Li_7La_3Zr_2O_{12}$ (hereinafter also referred to as "LLZ") has been proposed as an oxide material for forming a solid electrolyte layer (see Patent Document 1). Further, there has been proposed a technique for forming a composite metal oxide with a garnet-type structure as a lithium-ion conductive material by adding a sintering aid composed of a Al compound and a Si compound, or a Al compound and a Ge compound, to a mixed raw material of a Li compound, a La compound, a Zr compound and a Y compound etc., and then, sintering the mixed raw material at 1000 to 1200° C. (see Patent Document 2).

In order to obtain a dense sintered body of LLZ, however, it is necessary to perform sintering at a temperature of about 1100 to 1200° C. Under such sintering temperature conditions, there arise a quality problem of the occurrence of a change in the composition of the sintered body due to evaporation of lithium component during the sintering and an economic problem of the need for an expensive furnace capable of heating to high sintering temperatures. In the case of sintering the solid electrolyte together with the positive and negative electrode active materials, there also arises a problem of decomposition of the positive and negative electrode active materials under the above temperature conditions.

In view of these circumstances, it has been proposed to add a boron-containing compound to a calcined substance and fire the resulting material as a technique for obtaining a garnet-type oxide sintered body favorably even at a low sintering temperature.

For example, Patent Document 3 proposes a technique for producing a lithium-ion conductive oxide by preparing a liquid reactant containing a lithium compound, a lanthanum compound and a zirconium compound by so-called sol-gel process, drying and calcining the reactant and firing the resulting calcined pellet at a temperature lower than 1000° C. in the presence of a boron compound and an aluminum compound.

Patent Document 4 proposes a technique for producing a solid electrolyte by adding a flux to a lithium-ion conductive crystalline material and heating the resulting mixed material at 650 to 800° C. In this technique, the volume proportion of the flux is about 50 to 67%; and lithium borate or lithium borate in which boron is partially substituted by another element is used as the flux.

Furthermore, Patent Document 5 proposes a technique for producing a garnet-type ion conductive oxide material by adding lithium borate and aluminum oxide to a garnet-type ion conductive oxide and firing the resulting mixed material at 900° C. or lower, wherein the thus-produced garnet-type ion conductive oxide material includes: a base substance containing, as a main component, a composite oxide containing at least Li, La, Zr, Al, an element A (where A is one or more of Ca and Sr) and an element T (where T is one or more of Nb and Ta); and a grain boundary composition containing at least B and the element A.

PRIOR ART DOCUMENTS

Patent Documents

Patent Document 1: Japanese Laid-Open Patent Publication (Translation of International Publication) No. 2010-534383 (also published as Japanese Patent No. 5634865)
Patent Document 2: Japanese Laid-Open Patent Publication No. 2013-134852
Patent Document 3: Japanese Laid-Open Patent Publication No. 2013-184848
Patent Document 4: Japanese Laid-Open Patent Publication No. 2013-37992
Patent Document 5: Japanese Laid-Open Patent Publication No. 2015-41573

SUMMARY OF THE INVENTION

Problems to be Solved by the Invention

The sintering of a garnet-type oxide with the use of a sintering aid has been proposed. Even with the use of the sintering aid, however, it is not easy to lower a sintering temperature and obtain a dense sintered body. In the technique of Patent Document 5, the added Al is incorporated in the LLZ and is not almost contained in the grain boundary composition of the sintered body whereby the grain boundary composition contains B and the element A (such as Ca) expelled from the base substance by the added Al. Similarly, in the technique of Patent Document 3 in which the sintering is performed in the presence of the boron compound and the aluminum compound, it is assumed that the aluminum is incorporated in the LLZ whereby only the boron remains in the grain boundary composition between the LLZ crystal grains. In other words, only the boron compound, especially lithium borate, serves as a sintering aid that becomes the grain boundary composition of the sintered body after the sintering in the techniques of Patent Documents 3 and 5.

However, the grain boundary composition exerts an influence on the ion conductivity of the sintered body. There is thus a demand to use a sintering aid capable of not only allowing low-temperature sintering but also achieving high ion conductivity as compared to conventional boron-based sintering aids.

It is accordingly an object of the present invention to produce a dense, high ion conductive garnet-type oxide sintered body with the use of a sintering aid.

Means for Solving the Problems

As a result of extensive researches, the present inventors have found that it is possible to obtain a high-density sintered body of garnet-type oxide by using a sintering aid containing oxygen, boron, silicon and lithium during sintering of the garnet-type oxide. The present invention is based on this finding.

Namely, the present invention provides the following aspects.

(1) A garnet-type oxide sintered body comprising: crystal grains composed of a garnet-type oxide containing Li, La and Zr; and a grain boundary composition containing boron and silicon and filling gaps between the crystal grains.
(2) The garnet-type oxide sintered body according to (1), wherein a volume proportion of the grain boundary composition in the sintered body is 2 to 50 volume %.
(3) The garnet-type oxide sintered body according to (1) or (2), wherein the sintered body has a density of 3.6 g/cm$^3$ or higher.
(4) The garnet-type oxide sintered body according to any one of (1) to (3), wherein a ratio of boron and silicon atoms contained in the grain boundary composition is 0.2:1 to 19.2 to 1.
(5) The garnet-type oxide sintered body according to claim (4), wherein the garnet-type oxide has a basic composition represented by the formula: $(Li_{7-3x}Al_x)La_3Zr_2O_{12}$ where $0 \leq x < 0.4$.
(6) A lithium secondary battery comprising: a lithium-ion conductive solid electrolyte layer; and an active material layer stacked on the solid electrolyte layer and being capable of absorbing and releasing lithium, wherein the garnet-type oxide sintered body according to any one of (1) to (3) is used as the solid electrolyte layer.
(7) A method of producing the garnet-type oxide sintered body according to (1), comprising: a step of providing a precursor material by mixing a garnet-type oxide powder containing Li, La and Zr with a sintering aid; a step of forming the precursor material into a formed body; and a sintering step of sintering the formed body, wherein the sintering aid contains oxygen, boron, silicon and lithium, and wherein the oxygen and boron, or the oxygen and silicon, contained in the sintered aid form a compound.
(8) The method of producing the garnet-type oxide sintered body according to (7), wherein the sintering aid contains a compound selected from the group consisting of $B_2O_3$, $LiBO_2$, $LiB_3O_5$, $Li_2B_4O_7$, $Li_2B_2O_4$, $Li_2B_6O_{10}$, $Li_2B_8O_{13}$, $Li_3BO_3$, $Li_4B_2O_5$ and $Li_6BO_9$.
(9) The method of producing the garnet-type oxide sintered body according to (7), wherein the sintering aid contains a compound selected from the group consisting of $SiO_2$, $Li_2SiO_3$, $Li_2Si_2O_5$, $Li_2Si_3O_7$, $Li_4SiO_4$, $Li_6Si_2O_7$ and $Li_8SiO_6$.
(10) The method of producing the garnet-type oxide sintered body according to (7), wherein the sintering aid is a mixture of $Li_2B_4O_7$ and $Li_2SiO_3$.
(11) The method of producing the garnet-type oxide sintered body according to (7), wherein the sintering aid is a mixture of $Li_2B_4O_7$ and $SiO_2$.
(12) The method of producing the garnet-type oxide sintered body according to any one of (7) to (11), wherein a ratio of boron and silicon atoms contained in the sintering aid is 0.2:1 to 19.2 to 1.
(13) The method of producing the garnet-type oxide sintered body according to any one of claims (7) to (12), wherein the sintering step is performed at a sintering temperature of 600° C. to 950° C.
(14) The method of producing the garnet-type oxide sintered body according to any one of claims (7) to (13), wherein the garnet-type oxide powder contains Li, La, Zr and Al.
(15) A method of producing a garnet-type oxide sintered body, comprising: an aqueous solution preparation step of preparing an aqueous solution containing La and Zr; a simultaneous precipitation step of forming a precipitate by mixing the aqueous solution with a basic aqueous solution; a calcination step of heating a mixture of the precipitate with a lithium compound, thereby obtaining a garnet-type oxide powder containing Li, La and Zr; a step of providing a precursor material by mixing the garnet-type oxide powder with a sintering aid containing oxygen, boron, silicon and lithium; a step of forming the precursor material into a formed body; and a sintering step of sintering the formed body.
(16) The method of producing the garnet-type oxide sintered body according to (15), wherein the aqueous solution prepared in the aqueous solution preparation step contains La, Zr and Al, and wherein the garnet-type oxide powder contains Li, La, Zr and Al.
(17) The method of producing the garnet-type oxide sintered body according to any one of (7) to (16), wherein an amount of lithium contained in the garnet-type oxide powder is larger than an equivalent amount required for garnet-type oxide.

In the present invention, it is possible to sinter the garnet-type oxide favorably even at a relatively low sintering temperature and provide the garnet-type oxide sintered body with a high density and high ion conductivity due to the formation of the grain boundary composition by reaction of the sintered aid.

DETAILED DESCRIPTION OF EMBODIMENTS

Figure 1:
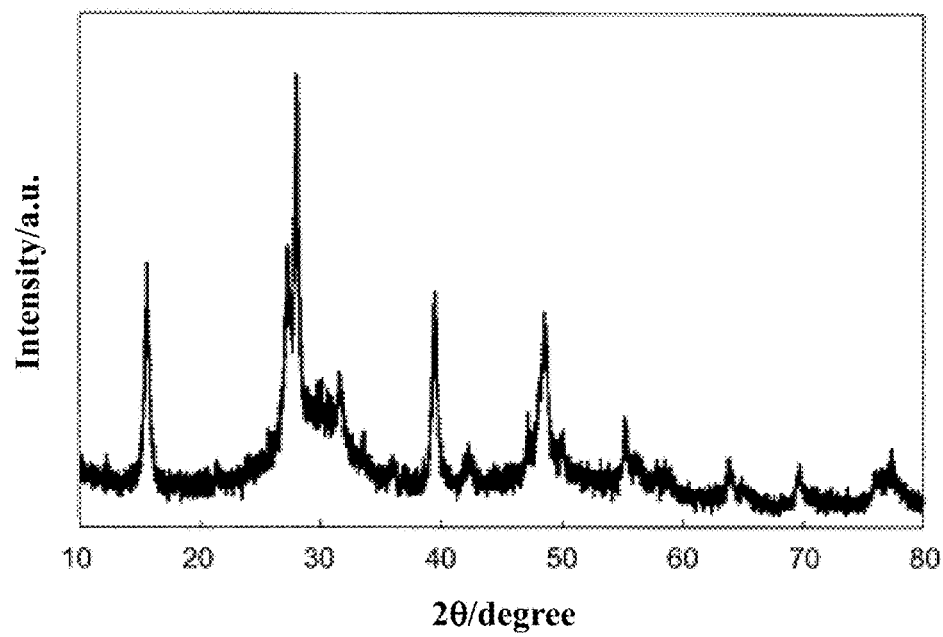
FIG. 1 shows a powder X-ray diffraction pattern of a precipitate obtained in Example 1.

Hereinafter, a production method of a garnet-type oxide sintered body according to the present invention will be described below.

<Production Method of Sintered Body>

The production method of the garnet-type oxide sintered body according to the present invention includes: a step of providing a precursor material by mixing a garnet-type oxide powder containing Li, La and Zr with a sintering aid; a step of forming the precursor material into a formed body; and a sintering step of sintering the formed body. In the present invention, the sintering aid contains oxygen, boron, silicon and lithium; and the oxygen and boron, or the oxygen and silicon, contained in the sintering aid form a compound.

The compound of the oxygen with boron, or with boron and lithium, contained in the sintering aid is preferably a boron oxide or a boric acid compound selected from lithium borates. Specific example of the boron oxide are $B_2O_3$. Specific examples of the lithium borates are $LiBO_2$, $LiB_3O_5$, $Li_2B_4O_7$, $Li_2B_2O_4$, $Li_2B_6O_{10}$, $Li_2B_8O_{13}$, $Li_3BO_3$, $Li_4B_2O_5$ and $Li_6B_4O_9$.

The compound of the oxygen with silicon, or with silicon and lithium, contained in the sintering aid is preferably a silicon oxide or a silicic acid compound selected from lithium silicates. Specific example of the silicon oxide are $SiO_2$. Specific examples of the lithium silicates are $Li_2SiO_3$, $Li_2Si_2O_5$, $Li_2Si_3O_7$, $Li_4SiO_4$, $Li_6Si_2O_7$ and $Li_8SiO_6$.

The sintering aid can be prepared by any of the following techniques: mixing a lithium compound, a boron oxide and a silicon oxide; mixing a lithium borate and a lithium silicate; mixing a lithium borate and a silicon oxide; and mixing a boron oxide and a lithium silicate. In order for the sintering aid to form a compound with a melting point of 1000° C. or lower, the molar ratio of boron and silicon atoms in the sintering aid is preferably 0.2:1 to 19.2:1. The molar ratio of boron and silicon atoms in the sintering aid is more preferably 0.6:1 to 19.2:1 in order for the sintering aid to form a compound with a melting point of 900° C. or lower. The molar ratio of boron and silicon atoms in the sintering aid is particularly preferably 0.9:1 to 7.1:1 in order for the sintering aid to form a compound with a melting point of 850° C. or lower.

The sintering aid preferably has a lithium content corresponding to 1 to 20 mass %, more preferably 5 to 15 mass %. Further, the sintering aid preferably has a silicon content corresponding to 1 to 35 mass %, more preferably 5 to 20 mass %. In such a composition range, the sintering aid forms a compound with a melting point of 1000° C. or lower so that, during the sintering step, the sintering aid can enter in between crystal grains of garnet-type oxide and constitute a grain boundary composition.

There is no particular limitation on the technique for mixing the garnet-type oxide powder with the sintering aid and on the technique for mixing the lithium borate and the lithium silicate during the preparation of the sintering aid. The mixing can be done by means of an ordinary mortar, ball mill, jet mill etc. and can be done in a wet process or a dry process. The sintering aid can be added in the form of a solid such as powder, or an aqueous solution, without particular limitation.

In the forming step of the precursor material in which the garnet-type oxide powder is mixed with the sintering aid, it is preferable to form a powder of the precursor material into a predetermined shape with the application of pressure. The powder of the precursor material is generally formed into a predetermined shape such as pellet shape by means of a mold or formed into a sheet shape. In the case of forming the precursor material by the mold, the forming pressure can be set to within the range of e.g. 100 to 1000 MPa.

In the case of forming the precursor material into a sheet shape, it is conceivable to disperse the powder of the precursor material in a solvent, apply the resulting disperse system, dry out the solvent and then pressurize the precursor material by means of a roll press etc. For example, the precursor material can preferably be formed into a sheet shape by applying a slurry of a solvent, a binder and the precursor material powder to a resin sheet, drying the slurry, peeling the resin sheet and removing the binder under heating. In the case of forming the precursor material into a sheet shape, the forming pressure can be set to within the range of e.g. 20 to 2000 N/mm. The precursor material, when formed into a sheet shape, may be stacked with positive and negative electrode layers for an all-solid-state lithium secondary battery, or precursors thereof, during the forming step.

There is no particular limitation on the technique for heating the formed body in the sintering step. The heating can be done by resistance heating, microwave heating etc. It is feasible to adopt a conventional sintering technique such as electric current sintering or spark plasma sintering for simultaneously performing the forming step and the sintering step. The higher the sintering temperature in the sintering step, the denser the sintered body. The sintering temperature is generally 1100° C. or lower, preferably 1000° C. or lower. In order to suppress evaporation of lithium during the sintering, it is preferable to perform the sintering at 950° C. or lower. In the case where the precursor material is stacked with positive and negative electrode material layers for an all-solid-state lithium ion secondary battery, it is more preferable to perform the sintering at 850° C. or lower in order to prevent decomposition of the positive and negative electrode active materials. The sintering temperature is preferably 600° C. or higher, more preferably 700° C. or higher, in order to increase the flowability of the sintering aid and fill the gaps between the crystal grains of garnet-type oxide. The sintering can be performed under any atmosphere such as air atmosphere, inert atmosphere of nitrogen etc., highly oxidizing atmosphere of oxygen etc., or reducing atmosphere of hydrogen etc.

It is preferable that the amount of lithium in the Li/La/Zr-containing garnet-type oxide powder is larger than the equivalent amount required for the garnet-type oxide. Herein, the equivalent amount required for the garnet-type oxide means the amount of lithium required for the garnet-type oxide represented by the basic composition formula: $(Li_{7-3x}, Al_x)La_3Zr_2O_{12}$ where $0 \le x < 0.4$. There occurs evaporation of low-melting lithium component by heating during calcination and sintering. Further, the garnet-type oxide and the sintering aid may be reacted during sintering so that there may be developed an impurity phase of $La_2Zr_2O_7$, $La_2O_3$ etc. due to insufficiency of lithium. On the other hand, the simple salt of lithium, such as LiOH, is easily evaporated by heating. For these reasons, the garnet-type oxide powder used in the sintering step contains a large amount of lithium component so as to suppress evaporation of lithium component and compensate for the evaporation of lithium component and for the loss of lithium component by reaction with the sintering aid. The amount of lithium component is preferably larger by about 1 to 50 mol %, more preferably by about 5 to 40 mol %, than the equivalent amount required for the garnet-type oxide. Furthermore, the addition of a large amount of lithium component to the garnet-type oxide powder allows use of a low-lithium-content compound, which is relatively stable and easy to produce, as the sintering aid.

The sintering time can be adjusted as appropriate depending on the sintering temperature etc. In practice, the sintering time is preferably 1 to 24 hours. There is no particular limitation on the technique for cooling the sintered body. The cooling can be generally done by natural cooling (in-furnace cooling) or slow cooling.

<Structure of Sintered Body>

The sintered body according to the present invention has a plurality of crystal grains composed of garnet-type oxide containing Li, La and Zr and a grain boundary composition containing boron and silicon and filling gaps between the crystal grains. The grain boundary composition performs the function of conducting lithium ions between the crystal grains of garnet-type oxide so as to improve the lithium-ion conductivity of the sintered body.

As the Li/La/Zr-containing garnet-type oxide, there can be used a garnet-type oxide represented by the basic composition formula: $(Li_{7-3x}, Al_x)La_3Zr_2O_{12}$ where $0 \le x < 0.4$. This garnet-type oxide shows lithium-ion conductivity and thus can suitably be used as a solid electrolyte for a lithium ion secondary battery. The garnet-type oxide may be doped with a doping element such as Nb or may have a distortion in crystal lattice. The garnet-type oxide preferably contains Al so as to develop a cubic crystal phase of higher lithium-ion conductivity with a stabilized crystal structure. As long as the garnet-type oxide is formed, there is not particular limitation on the garnet-type oxide used in the production method of the sintered body. The garnet-type oxide can be used in calcined form after calcination or in fired form after firing.

The volume proportion of the grain boundary composition in the sintered body is preferably 2 to 50 volume %, more preferably 3 to 30 volume %, still more preferably 5 to 20 volume %. Namely, it is preferable to mix the garnet-type oxide and the sintering aid at the above proportion ratio during production of the sintered body. Since the lithium-ion conductivity of the sintering aid is inferior to that of the garnet-type oxide, too large amount of the grain boundary composition (sintering aid) in the sintered body leads to a deterioration in the lithium-ion conductivity of the sintered body. The volume proportion of the grain boundary composition in the sintered body can be determined by observing the sintered body with an electron microscope and measuring the proportion of the grain boundary composition in a predetermined range.

The molar ratio of boron and silicon atoms in the grain boundary composition of the sintered body is preferably 0.2:1 to 19.2 to 1, more preferably 0.6:1 to 19.2:1, still more preferably 0.9:1 to 7.1:1. The grain boundary composition preferably has a silicon content corresponding to 1 to 35 mass %, more preferably 5 to 20 mass %.

Further, the sintered body preferably has a density of 3.6 g/cm³ or higher, more preferably 4.2 g/cm³ or higher. When the actual density of the sintered body is 3.6 g/cm³ or higher, or 4.2 g/cm³ or higher, the relative density of the sintered body relative to the theoretical density of the garnet-type oxide (5.115 g/cm³) is about 70% or higher, or about 82% or higher. The denser the sintered body, the higher the lithium-ion conductivity of the sintered body.

<Production Method of Garnet-Type Oxide>

There is no particular limitation on the method for producing the Li/La/Zr-containing garnet-type oxide. The garnet-type oxide can be produced by any of the following solid phase process, sol-gel process or simultaneous precipitation process (coprecipitation process). In the present invention, it is preferable to adopt the simultaneous precipitation process by which a fine powder can be obtained from a low-cost raw material.

In the solid phase process, the garnet-type oxide powder is produced by mixing oxides, hydroxides or salts of lithium, lanthanum and zirconium at about a stoichiometric ratio and firing the resulting mixture.

In the sol-gel process, the garnet-type oxide powder is produced by preparing a sol solution containing lithium, lanthanum and zirconium while stabilizing the dissolved state of zirconium with the use of an organic ligand, converting the sol solution to a gel as a solid precursor material by the addition of a catalyst or by heating and concentration, and then, firing the precursor material.

In the simultaneous precipitation process, the garnet-type oxide powder is produced by forming a precipitate containing lanthanum and zirconium from a lanthanum/zirconium-containing solution, providing a precursor material by the addition of lithium component to the precipitate, and then, firing the precursor material.

(Simultaneous Precipitation Process)

Since the garnet-type oxide is precipitated as a fine powder in the simultaneous precipitation process, the garnet-type oxide powder obtained by the simultaneous precipitation process can be sintered to a dense sintered body as compared to the solid phase process. The simultaneous precipitation process, which can suitably be adopted in the present invention, will be hereinafter explained below in detail.

A production method of the garnet-type oxide according to one embodiment of the present invention includes: an aqueous solution preparation step of preparing an aqueous solution containing lanthanum and zirconium; a simultaneous precipitation step of mixing the aqueous solution prepared in the aqueous solution preparation step with a basic aqueous solution, thereby causing precipitation of an oxide and/or hydroxide of lanthanum and an oxide and/or hydroxide of zirconium; and a calcination step of mixing the precipitate obtained in the simultaneous precipitation step with a lithium compound to provide a precursor material, and then, calcining the precursor material.

[Aqueous Solution Preparation Step]

In the aqueous solution preparation step, the aqueous solution containing lanthanum and zirconium is prepared. The thus-prepared aqueous solution contains, for example, $La^{3+}$ and $Zr^{4+}$. Each of lanthanum and zirconium may be present in the form of a complex with a ligand such as water, ammonia, oxide ion, hydroxide ion or the after-mentioned counter anion.

Examples of counter anions of lanthanum and zirconium in the aqueous solution include, in addition to oxide ion and hydroxide ion, chlorine-containing anion such as chloride ion, nitrate anion, and the like. These counter anions can be used solely or in combination of two or more kinds thereof.

It is feasible to prepare the aqueous solution by e.g. dissolving, in water or an acidic aqueous solution, a lanthanum compound capable of generating lanthanum-containing cations by dissolution and a zirconium compound capable of generating zirconium-containing cations by dissolution. Examples of each of the lanthanum and zirconium compounds are chloride, oxychloride, hydroxide, oxide and nitrate. Among others, there can preferably be used chloride or oxychloride in terms of easy availability and low cost. Further, nitrate can also preferably be used in terms of ease of dissolution. There is no particular limitation on the forms of the lanthanum and zirconium compounds. Each of the lanthanum and zirconium compounds can be in the form of a solid such as powder or an aqueous solution. Further, the above lanthanum compounds can be used solely or in combination of two or more kinds thereof; and the above zirconium compounds can be used solely or in combination of two or more kinds thereof.

Preferably, the aqueous solution prepared in the aqueous solution preparation step has a pH of lower than 7. In other words, the aqueous solution prepared in the aqueous solution preparation step is preferably acidic. Although $La^{3+}$ shows water solubility in the range from high acidity to low acidity, $Zr^{4+}$ shows water solubility only in the range of high acidity. It is thus preferable that the aqueous solution prepared in the aqueous solution preparation step is strongly acidic (e.g. with a pH of 3 or lower) in terms of safety.

In the case where the garnet-type oxide contains Al, an aluminum compound can be added to the aqueous solution in the aqueous solution preparation step. Examples of the aluminum compound are chloride, oxychloride, hydroxide, oxide and nitrate.

[Simultaneous Precipitation Step]

In the simultaneous precipitation step, the oxide and/or hydroxide of lanthanum and the oxide and/or hydroxide of zirconium is precipitated as the precipitate by mixing the aqueous solution prepared in the aqueous solution preparation step with the basic aqueous solution. There is no particular limitation on the technique for mixing the aqueous solution prepared in the aqueous solution preparation step with the basic aqueous solution. For example, the aqueous solution prepared in the aqueous solution preparation step can be dropped or sprayed into the basic aqueous solution.

Preferably, the basic aqueous solution has a pH of 8 or higher in terms of precipitation speed. There is no particular limitation on the kind of the basic aqueous solution. Examples of the basic aqueous solution are aqueous ammonia and an aqueous lithium hydroxide solution. It is preferable to use aqueous ammonia in terms of easy availability and low cost. It is preferable to use an aqueous lithium hydroxide solution containing, as alkali cations, lithium ions, that is, constituent cations of the solid electrolyte in terms of prevention of contamination to the solid electrolyte.

The molar equivalent of a base in the basic aqueous solution used in the simultaneous precipitation step is preferably larger than the molar equivalent of the counter anions of the lanthanum-containing and zirconium-containing cations (except the oxide and hydroxide ions) in the aqueous solution prepared in the aqueous solution preparation step. It is more preferable that the molar equivalent of the base in the basic aqueous solution is largely excessive (e.g. larger than about twice the molar equivalent of the counter anions in the prepared aqueous solution). It is easy to maintain the sufficient basicity of the mixed solution of the basic aqueous solution and the aqueous solution prepared in the aqueous solution preparation step when the molar equivalent of the base in the basic aqueous solution is larger than the molar equivalent of the counter anions in the prepared aqueous solution.

The precipitate obtained in the simultaneous precipitation step is separated and washed as appropriate. There is no particular limitation on the technique for separating the precipitate. The separation can be done by e.g. centrifugation, decantation or filtration. There is no particular limitation on the solvent used for washing of the precipitate. There can preferably be used water as the washing solvent in terms of easy availability and low cost.

[Calcination Step]

In the calcination step, the solid electrolyte precursor material is provided by mixing the precipitate obtained in the simultaneous precipitation step with the lithium compound, and then, is subjected to calcination.

It is feasible to use one kind of lithium compound or two or more kinds of lithium compounds. There is no particular limitation on the kind of the lithium compound. Examples of the lithium compound are lithium carbonate, lithium chloride, lithium fluoride, lithium oxide, lithium nitrate and lithium acetate. There is also no particular limitation on the form of the lithium compound. The lithium compound can be in the form of a solid such as powder or an aqueous solution.

As the lithium compound, there can alternatively be used a composite oxide of lithium and any solid electrolyte precursor element other than lithium. Examples of such a composite oxide are lithium-zirconium composite oxides (such as $Li_2ZrO_3$ and $Li_4ZrO_4$), lithium niobate ($LiNbO_3$) and lithium tantalate ($LiTaO_3$).

There is no particular limitation on the technique for mixing the precipitate with the lithium compound. The mixing can be done by means of an ordinary mortar, ball mill, jet mill etc. and can be done in a wet process or a dry process.

The precursor material provided as the mixture of the precipitate and the lithium compound is calcined at a temperature of 1000° C. or lower. As a result of the calcination, there is obtained the garnet-type oxide (in calcined form) containing lithium, lanthanum and zirconium. The calcination temperature is generally 1000° C. or lower, preferably 600 to 800° C. The calcination can be performed under any atmosphere such as, inert atmosphere, air atmosphere, highly oxidizing atmosphere of oxygen etc., or reducing atmosphere of hydrogen etc.

<Lithium Secondary Battery>

A lithium secondary battery according to the present invention has: a positive electrode containing a positive electrode active material capable of absorbing and releasing lithium; a negative electrode containing a negative electrode active material capable of absorbing and releasing lithium; and a solid electrolyte arranged between the positive electrode and the negative electrode so as to allow conduction of lithium ions, wherein the above-mentioned garnet-type oxide sintered body is used as the solid electrolyte. The lithium secondary battery can be configured as an all-solid-state lithium secondary battery. There is no particular limitation on the shape of the lithium secondary battery. For example, the lithium secondary battery can have a coin shape, a button shape, a sheet shape, a laminate shape, a cylindrical shape, a flat shape, a rectangular shape or the like.

EXAMPLES

The present invention will be described in more detail below by way of the following examples. It should however be noted that the following examples are illustrative and are not intended to limit the present invention thereto.

Example 1

<Production of Garnet-type Oxide by Simultaneous Precipitation Process>

[Simultaneous Precipitation Step]

A solution of lanthanum nitrate hexahydrate in water, a solution of zirconium oxynitrate dihydrate in 2N nitric acid and a solution of aluminum nitrate nonahydrate in water were mixed together, thereby preparing an aqueous solution with a La concentration of 0.319 mmol/g, a Zr concentration of 0.213 mmol/g and an Al concentration of 0.021 mmol/g. The prepared aqueous solution was transparent and did not form a precipitate even when left at room temperature. Then, 540 g of the prepared aqueous solution was sprayed into 300 g of 28 mass % aqueous ammonium whereby there was formed a precipitate. The precipitate was separated, washed with water, dried at 200° C. and then subjected to mechanical grinding. The thus-obtained precipitate was analyzed by powder X-ray diffraction measurement using CuKα radiation. The measured X-ray diffraction pattern showed broad peaks assigned to La(OH)$_3$ as shown in FIG. 1.

[Calcination Step]

Figure 2:
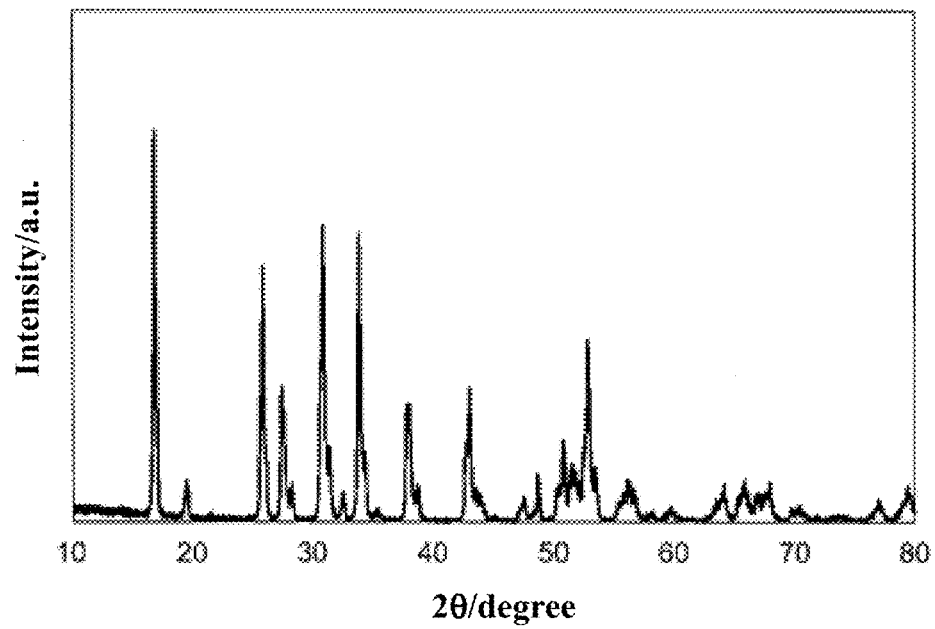
FIG. 2 shows a powder X-ray diffraction pattern of a calcined substance obtained in Example 1.

A suspension was provided by putting the above-obtained precipitate into an evaporation dish and adding a 4N aqueous lithium hydroxide solution to the precipitate. Since the ratio of garnet-type oxide constituent elements was Li:La:Zr:Al=6.4:3:2:0.2, the amount of lithium contained in the suspension was larger by about 7 mol % than the equivalent amount required for the garnet-type oxide. The suspension was dried to a powder at 120° C. The powder was subjected to mixing and grinding in isopropyl alcohol by a planetary ball mill (300 rpm/zirconia ball) for 3 hours. After that, the powder was separated from the ball and isopropyl alcohol, dried and then calcined in an alumina calcination boat at 700° C. for 5 hours under nitrogen atmosphere. There was thus obtained a calcined substance. The calcined substance was analyzed by powder X-ray diffraction measurement using CuKα radiation. The measured X-ray diffraction pattern showed only peaks assigned to garnet-type oxide LLZ (Li$_7$La$_3$Zr$_2$O$_{12}$) as shown in FIG. 2. It was confirmed from this measurement result that the calcined substance was of single-phase garnet-type oxide.

[Preparation of Sintering Aid]

A sintering aid was prepared by mixing Li$_2$B$_4$O$_7$ and Li$_2$SiO$_3$ at 60:40 (mass ratio).

[Sintering Step]

To the calcined substance, 5 mass % (about 9.4 volume % by volume conversion) of the sintering aid was added. This mixture was subjected to mixing and grinding in isopropyl alcohol by a planetary ball mill (300 rpm/zirconia ball) for 12 hours. The composition ratio (molar ratio) of the respective elements after the mixing of the calcined substance with the sintering aid was Li:La:Zr:Al:B:Si=7.5:3:2:0.2:0.6:0.19. The resulting mixed powder was separated from the ball and isopropyl alcohol and provided as precursor material by drying at 200° C. The precursor material was formed into a formed body by a mold of 13 mm diameter with the application of a pressure of 740 MPa. The formed body was sintered in the air for 12 hours at 850° C. The thus-obtained sintered body had crystal grains of cubic garnet-type oxide.

Example 2

A sintered body with crystal grains of cubic garnet-type oxide was produced in the same manner as in Example 1, except that a sintering aid was prepared by mixing Li$_2$B$_4$O$_7$ and SiO$_2$ at 68.5:31.5 (mass ratio). The composition ratio (molar ratio) of the respective elements after the mixing of the calcined substance with the sintering aid was Li:La:Zr:Al:B:Si=7.2:3:2:0.2:0.68:0.22.

Example 3

A sintered body with crystal grains of cubic garnet-type oxide was produced in the same manner as in Example 1, except that: a sintering aid was prepared by adding a 4N aqueous lithium hydroxide solution; and the composition ratio (molar ratio) of lithium and lanthanum after the addition of the sintering aid to the calcined substance was set to Li:La=8.5:3.

Example 4

A sintered body with crystal grains of cubic garnet-type oxide was produced in the same manner as in Example 1, except that: a sintering aid was prepared by adding a 4N aqueous lithium hydroxide solution; and the composition ratio (molar ratio) of lithium and lanthanum after the addition of the sintering aid to the calcined substance was set to Li:La=7.85:3.

Example 5

A sintered body with crystal grains of cubic garnet-type oxide was produced in the same manner as in Example 1, except that, during the calcination step, the precipitate obtained in the simultaneous precipitation step was put into an evaporation dish and admixed with a 4N aqueous lithium hydroxide solution at a composition ratio of Li:La:Zr:Al=7.7:3:2:0.2. Namely, the amount of lithium contained in the suspension provided during the calcination step was larger by about 20 mol % than the equivalent amount required for garnet-type oxide.

Example 6

A sintered body with crystal grains of cubic garnet-type oxide was produced in the same manner as in Example 1, except that: during the calcination step, the precipitate obtained in the simultaneous precipitation step was put into an evaporation dish and admixed with a 4N aqueous lithium hydroxide solution at a composition ratio of Li:La:Zr:Al=8.75:3:2:0.2; and the sintering temperature during the sintering step was set to 1000° C. Namely, the amount of lithium contained in the suspension provided during the calcination step was larger by about 37 mol % than the equivalent amount required for garnet-type oxide. It was for the purpose of adding a larger amount of lithium in view of the fact that there would occur more evaporation of lithium component during sintering at 1000° C. than during sintering at 850° C.

Comparative Example 1

A sintered body was produced in the same manner as in Example 1, except that Li$_3$BO$_3$ was added as a sintering aid at a molar ratio of Ba/La=0.2 (corresponding to about 5.7 mass % by mass conversion and about 12.0 volume % by volume conversion).

Comparative Example 2

A sintering body was produced in the same manner as in Example 1, except that no sintering aid was added.

Example 7

<Production of Garnet-type Oxide by Solid Phase Process>

First, powders of La$_2$O$_3$, ZrO$_2$ and Al$_2$O$_3$ were mixed with a 4N aqueous lithium hydroxide solution at a composition ratio of Li:La:Zr:Al=7:3:2:0.2. The mixture was subjected to mixing and grinding by a planetary ball mill (300 rpm/zirconia ball) for 12 hours. After that, the resulting powder was separated from the ball and water, washed with water, dried and then calcined in an alumina calcination boat at 1000° C. for 5 hours under nitrogen atmosphere. There was thus obtained a calcined substance. The calcined substance was analyzed by powder X-ray diffraction measurement using CuKα radiation. The measured X-ray diffraction pattern showed only peaks assigned to garnet-type oxide LLZ ($Li_7La_3Zr_2O_{12}$). It was confirmed from this measurement result that the calcined substance was of single-phase garnet-type oxide.

[Preparation of Sintering Aid]

A sintering aid was prepared by mixing $Li_2B_4O_7$ and $Li_2SiO_3$ at 60:40 (mass ratio).

[Sintering Step]

To the calcined substance, 5 mass % (about 9.4 volume % by volume conversion) of the sintering aid was added. The mixture was subjected to mixing and grinding in isopropyl alcohol by a planetary ball mill (300 rpm/zirconia ball) for 12 hours. The composition ratio (molar ratio) of the respective elements after the mixing of the calcined substance with the sintering aid was Li:La:Zr:Al:B:Si=7.7:3:2:0.2:0.6:0.19. The resulting mixed powder was separated from the ball and isopropyl alcohol and provided as a precursor material by drying at 200° C. The precursor material was formed into a formed body by a mold of 13 mm diameter with the application of a pressure of 740 MPa. The formed body was sintered in the air for 12 hours at 850° C. The thus-obtained sintered body had crystal grains of cubic garnet-type oxide.

Comparative Example 3

A sintered body was produced in the same manner as in Example 7, except that $Li_3BO_3$ was added as a sintering aid at a molar ratio of Ba/La=0.2 (corresponding to about 5.7 mass % by mass conversion and about 12.0 volume % by volume conversion).

<Evaluation Methods>

[Evaluation of Relative Density]

The actual density of the obtained sintered body was determined by calculating the volume from the actual dimensions and dividing the volume by the dry weight. The actual density was converted to a relative density by dividing the actual density by the LLZ theoretical density value of 5.115 g/cm³.

[Evaluation of Lithium-Ion Conductivity]

Figure 6:
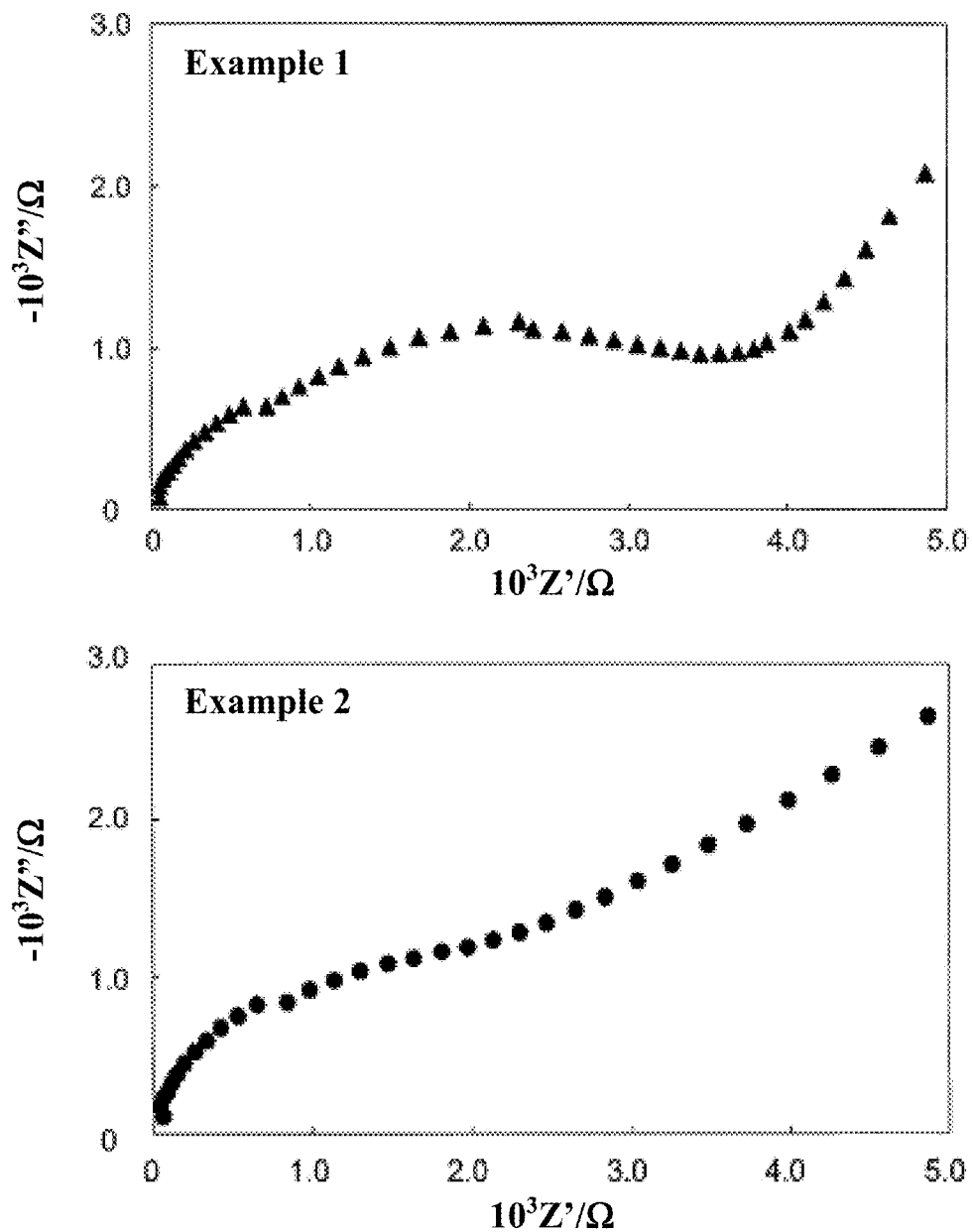
FIG. 6 shows Nyquist plots for the sintered bodies obtained in Example 1 and Example 2.
Figure 7:
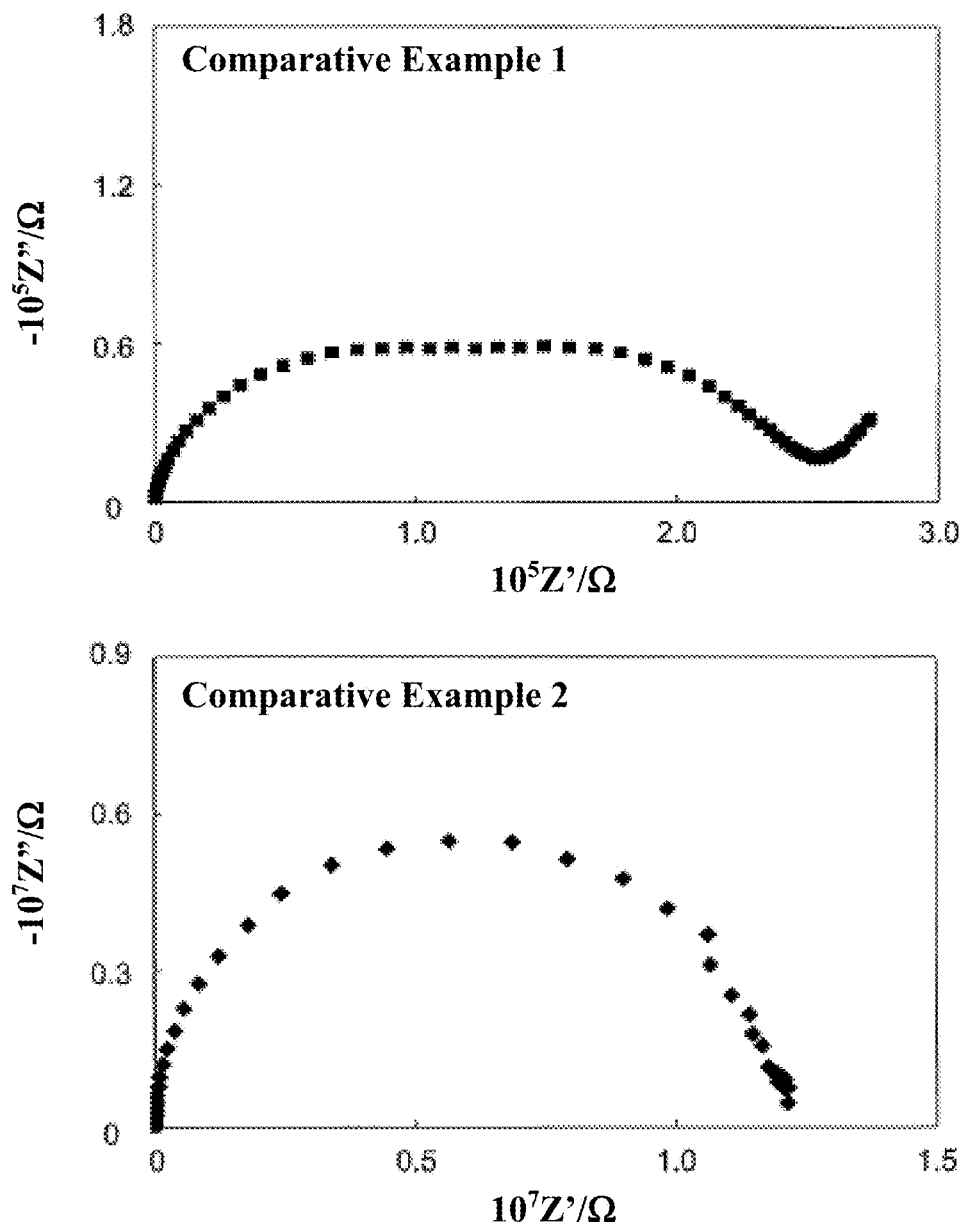
FIG. 7 shows Nyquist plots for the sintered bodies obtained in Comparative Example 1 and Comparative Example 2.

Gold was applied by vacuum deposition to both surfaces of the pellet-shaped sintered body. Then, impedance measurement was made on the sintered body with the use of an impedance analyzer (frequency: 1 Hz to 32 MHz, amplitude voltage: 100 mV). The resistance value of the sintered body was determined from an arc of the measured Nyquist plot. The lithium-ion conductivity of the sintered body was calculated based on the resistance value. The Nyquist plots for the sintered bodies of Examples 1 and 2 and Comparative Examples 1 and 2 are shown in FIGS. 6 and 7.

The respective evaluation results are summarized in TABLES 1 and 2.

TABLE 1

| | Composition (molar ratio) of calcined substance | | | | Sintering aid | Content [mass %] of Li in sintering aid | Composition (molar ratio) of calcined substance after mixing with sintering aid | | | | | | Sintering step | | Sintered body | |
|---|---|---|---|---|---|---|---|---|---|---|---|---|---|---|---|---|
| | Li | La | Zr | Al | Raw material | | Li | La | Zr | Al | B | Si | Temp. [° C.] | Time [H] | Relative Density | Lithium-ion conductivity [S/cm] (at room temp.) |
| Ex. 1 | 6.85 | 3 | 2 | 0.2 | $Li_2B_4O_7$ + $Li_2SiO_3$ | 11.1 | 7.5 | 3 | 2 | 0.2 | 0.6 | 0.19 | 850 | 12 | 88% | $1.3 \times 10^{-5}$ |
| Ex. 2 | 6.85 | 3 | 2 | 0.2 | $Li_2B_4O_7$ + $SiO_2$ | 5.6 | 7.2 | 3 | 2 | 0.2 | 0.68 | 0.22 | 850 | 12 | 85% | $1.9 \times 10^{-5}$ |
| Ex. 3 | 6.85 | 3 | 2 | 0.2 | $Li_2B_4O_7$ + $Li_2SiO_3$ | 11.1 | 8.5 | 3 | 2 | 0.2 | 0.6 | 0.19 | 850 | 12 | 71% | $4.4 \times 10^{-7}$ |
| Ex. 4 | 6.85 | 3 | 2 | 0.2 | $Li_2B_4O_7$ + $Li_2SiO_3$ * with addition of aq. LiOH sol. | 11.1 | 7.85 | 3 | 2 | 0.2 | 0.6 | 0.19 | 850 | 12 | 75% | $6.5 \times 10^{-7}$ |
| Ex. 5 | 7.7 | 3 | 2 | 0.2 | $Li_2B_4O_7$ + $Li_2SiO_3$ | 11.1 | 8.4 | 3 | 2 | 0.2 | 0.6 | 0.19 | 850 | 12 | 88% | $1.4 \times 10^{-5}$ |
| Ex. 6 | 8.75 | 3 | 2 | 0.2 | $Li_2B_4O_7$ + $Li_2SiO_3$ | 11.1 | 9.4 | 3 | 2 | 0.2 | 0.6 | 0.19 | 1000 | 12 | 90% | $1.3 \times 10^{-4}$ |
| Comp. Ex. 1 | 6.85 | 3 | 2 | 0.2 | $Li_3BO_3$ | 26.2 | 8.65 | 3 | 2 | 0.2 | 0.6 | 0 | 850 | 12 | 68% | $1.9 \times 10^{-7}$ |
| Comp. Ex. 2 | 6.85 | 3 | 2 | 0.2 | — | — | 6.85 | 3 | 2 | 0.2 | 0 | 0 | 850 | 12 | 62% | $3.5 \times 10^{-9}$ |

TABLE 2

| | Composition (molar ratio) of calcined substance | | | | Sintering aid | Content [mass %] of Li in sintering aid | Composition (molar ratio) of calcined substance after mixing with sintering aid | | | | | | Sintering step | | Sintered body | |
|---|---|---|---|---|---|---|---|---|---|---|---|---|---|---|---|---|
| | Li | La | Zr | Al | Raw material | | Li | La | Zr | Al | B | Si | Temp. [° C.] | Time [H] | Relative Density | Lithium-ion conductivity [S/cm] (at room temp.) |
| Ex. 7 | 7 | 3 | 2 | 0.2 | $Li_2B_4O_7$ + $Li_2SiO_3$ | 11.1 | 7.7 | 3 | 2 | 0.2 | 0.6 | 0.19 | 850 | 12 | 75% | $2.6 \times 10^{-6}$ |
| Comp. Ex. 3 | 7 | 3 | 2 | 0.2 | $Li_3BO_3$ | 26.6 | 8.8 | 3 | 2 | 0.2 | 0.68 | 0 | 850 | 12 | 64% | $1.0 \times 10^{-7}$ |

As shown in TABLE 1, each of the sintered bodies of Example 1 in which the mixture of $Li_2B_4O_7$ and $Li_2SiO_3$ was added as the sintering aid and Example 2 in which the mixture of $Li_2B_4O_7$ and $SiO_2$ was added as the sintering aid had a higher relative density and lithium-ion conductivity than those of Comparative Example 1 in which only $Li_3BO_3$ was added as the sintering aid and Comparative Example 2 in which no sintering aid was added. The garnet-type oxide sintered bodies of such high lithium-ion conductivity are usable as solid electrolytes.

Figure 3:
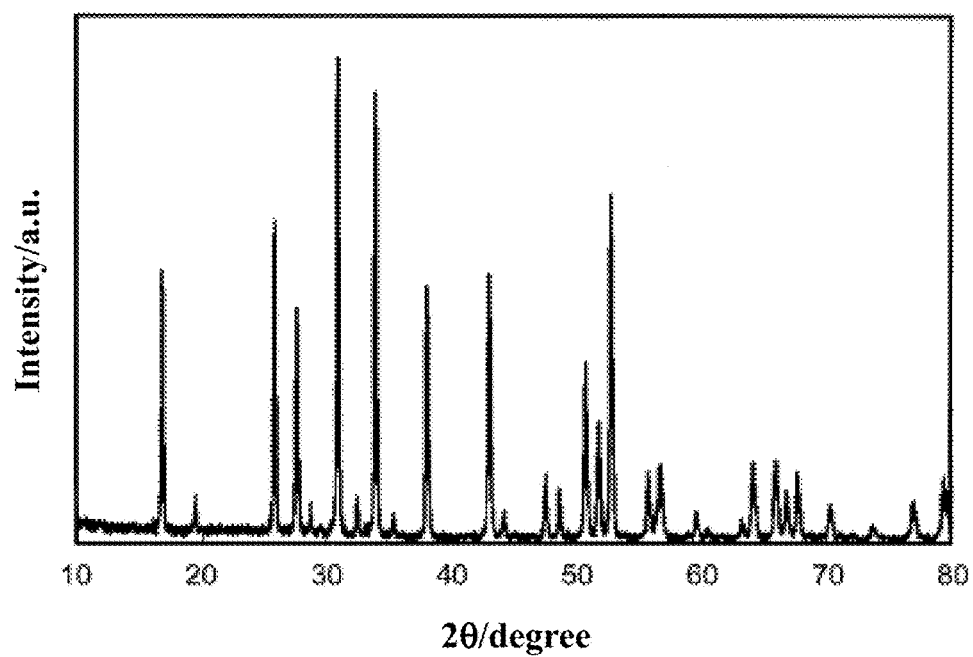
FIG. 3 shows a powder X-ray diffraction pattern of a sintered body obtained in Example 1.

A part of the sintered body of Example 1 was ground and analyzed by powder X-ray diffraction measurement using CuKα radiation. The measured X-ray diffraction pattern showed only peaks assigned to garnet-type oxide LLZ ($Li_7La_3Zr_2O_{12}$) as shown in FIG. 3.

Figure 4A:
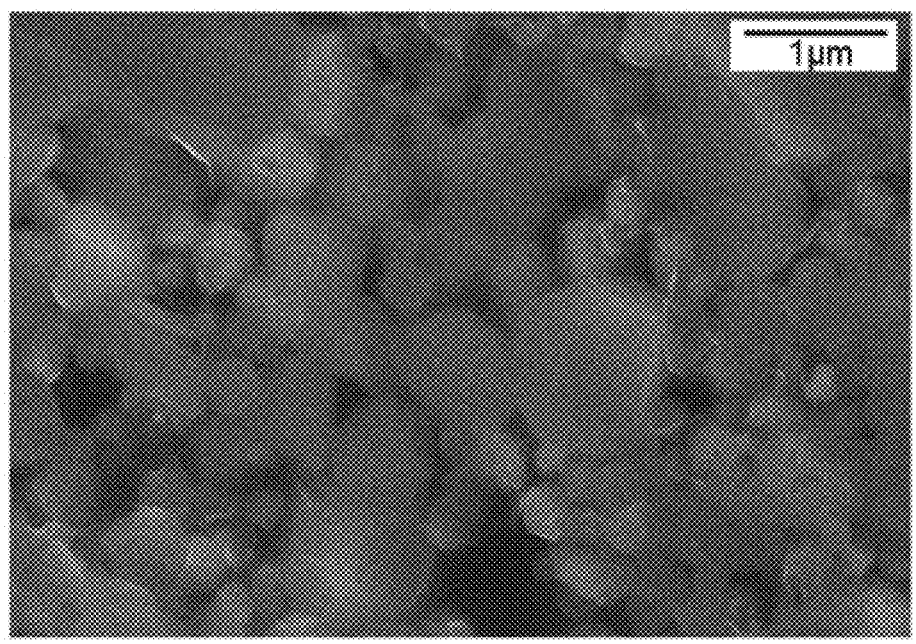
FIGS. 4A and 4B show scanning electron micrographs of a cross section of the sintered body obtained in Example 1.
Figure 4B:
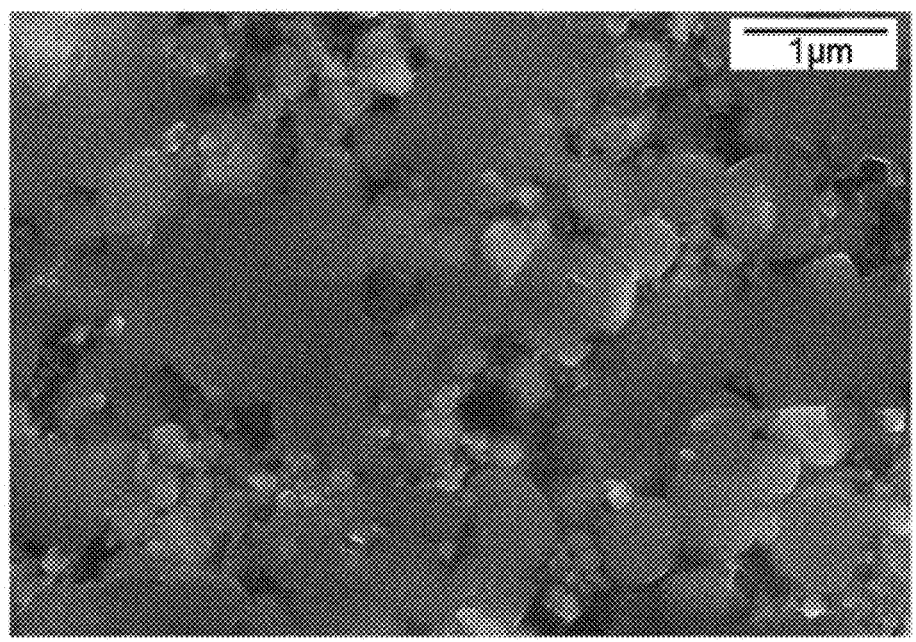
Figure 5:
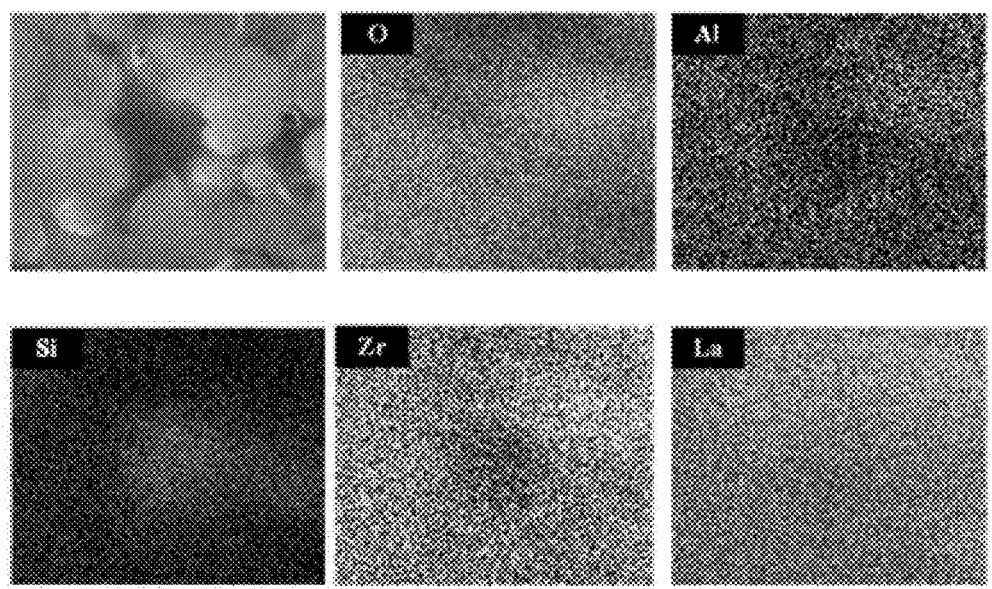
FIG. 5 shows elemental mapping of the sintered body obtained in Example 1.

Further, a cross section of the sintered body of Example 1 was observed with a scanning electron microscope. It was confirmed by this observation that, in the sintered body, the grains of 100 nm to 5 mm diameter were gathered together as shown in FIGS. 4(a) and (b). When elemental mapping was performed on the cross section of the sintered body of Example 1 by energy dispersive X-ray spectrometry (EDX), there were obtained elemental distribution images as shown in FIG. 5. In the SEM images of FIG. 5, a large amount of La and Zr was present in the white-colored grain regions; whereas a large amount of Si was present in the black regions surrounded by these grain regions. In other words, the white-colored regions were assigned to the grains of LLZ; and the black-colored regions were assigned to the grain boundary composition derived from the sintering aid. It was confirmed that the sintered body had a structure that the gaps between the grains of LLZ were filled with the grain boundary composition. Even though B is a light element difficult to detect, it is assumed that B was contained in the grain boundary composition as was Si.

It has been shown by comparison of Example 1, Examples 3 and 4 and Example 5 that: even when the amount of Li was increased with the addition of the aqueous LiOH solution with the sintering aid, the density of the sintered body did not become high due to ease of evaporation of the simple lithium salt; and it was possible to obtain the sintered body with high density and lithium-ion conductivity when Li was excessively added during the formation of the calcined substance.

In Example 6 in which the sintering was performed at 1000° C., the lithium-ion conductivity was improved in comparison with Example 1 in which the sintering was performed at 850° C. In the case of sintering the formed body along with positive and negative electrode active materials, however, it is preferable to perform the sintering at a lower temperature so as not to exert adverse effect on these active materials.

Similarly, when the garnet-type oxide produced by solid phase process was used, the sintered body of Example 7 in the mixture of $Li_2B_4O_7$ and $Li_2SiO_3$ was added as the sintering aid had a higher relative density and lithium-ion conductivity than those of Comparative Example 3 in only $Li_3BO_3$ was added as the sintering aid as shown in TABLE 2. Further, the sintered body of Example 1 in which the simultaneous precipitation process was undergone was higher in density than the sintered body of Example 7 in which the solid phase process was undergone.

The invention claimed is:

1. A garnet-type oxide sintered body comprising:
   crystal grains composed of a garnet-type oxide containing Li, La and Zr; and
   a grain boundary composition containing boron and silicon and filling gaps between the crystal grains.

2. The garnet-type oxide sintered body according to claim 1, wherein a volume proportion of the grain boundary composition in the sintered body is 2 to 50 volume %.

3. The garnet-type oxide sintered body according to claim 1, wherein the sintered body has a density of 3.6 $g/cm^3$ or higher.

4. The garnet-type oxide sintered body according to claim 1, wherein a ratio of boron and silicon atoms contained in the grain boundary composition is 0.2:1 to 19.2 to 1.

5. The garnet-type oxide sintered body according to claim 4, wherein the garnet-type oxide has a basic composition represented by the formula: $(Li_{7-3x}Al_x)La_3Zr_2O_{12}$ where $0 \leq x < 0.4$.

6. A lithium secondary battery comprising:
   a lithium-ion conductive solid electrolyte layer; and
   an active material layer stacked on the solid electrolyte layer and being capable of absorbing and releasing lithium,
   wherein the garnet-type oxide sintered body according to claim 1 is used as the solid electrolyte layer.

7. A method of producing the garnet-type oxide sintered body according to claim 1, comprising:
   a step of providing a precursor material by mixing a garnet-type oxide powder containing Li, La and Zr with a sintering aid;
   a step of forming the precursor material into a formed body; and
   a sintering step of sintering the formed body,
   wherein the sintering aid contains oxygen, boron, silicon and lithium, and
   wherein the oxygen and boron, or the oxygen and silicon, contained in the sintered aid form a compound.

8. The method of producing the garnet-type oxide sintered body according to claim 7, wherein the sintering aid contains a compound selected from the group consisting of $B_2O_3$, $LiBO_2$, $LiB_3O_5$, $Li_2B_4O_7$, $Li_2B_2O_4$, $Li_2B_6O_{10}$, $Li_2B_8O_{13}$, $Li_3BO_3$, $Li_4B_2O_5$ and $Li_6BO_9$.

9. The method of producing the garnet-type oxide sintered body according to claim 7, wherein the sintering aid contains a compound selected from the group consisting of $SiO_2$, $Li_2SiO_3$, $Li_2Si_2O_5$, $Li_2Si_3O_7$, $Li_4SiO_4$, $Li_6Si_2O_7$ and $Li_8SiO_6$.

10. The method of producing the garnet-type oxide sintered body according to claim 7, wherein the sintering aid is a mixture of $Li_2B_4O_7$ and $Li_2SiO_3$.

11. The method of producing the garnet-type oxide sintered body according to claim 7, wherein the sintering aid is a mixture of $Li_2B_4O_7$ and $SiO_2$.

12. The method of producing the garnet-type oxide sintered body according to claim 7, wherein a ratio of boron and silicon atoms contained in the sintering aid is 0.2:1 to 19.2 to 1.

13. The method of producing the garnet-type oxide sintered body according to claim 7, wherein the sintering step is performed at a sintering temperature of 600° C. to 950° C.

14. The method of producing the garnet-type oxide sintered body according to claim 7, wherein the garnet-type oxide powder contains Li, La, Zr and Al.

15. The method of producing the garnet-type oxide sintered body according to claim 7, further comprising obtaining the garnet-type oxide powder by the following steps:
   an aqueous solution preparation step of preparing an aqueous solution containing La and Zr;

a simultaneous precipitation step of forming a precipitate by mixing the aqueous solution with a basic aqueous solution; and a calcination step of heating a mixture of the precipitate with a lithium compound.

16. The method of producing the garnet-type oxide sintered body according to claim 15, wherein the aqueous solution prepared in the aqueous solution preparation step contains La, Zr and Al, and wherein the garnet-type oxide powder contains Li, La, Zr and Al.

17. The method of producing the garnet-type oxide sintered body according to any one of claims 7, wherein an amount of lithium contained in the garnet-type oxide powder is larger than an equivalent amount required for garnet-type oxide.

18. The method of producing the garnet-type oxide sintered body according to claim 15, wherein an amount of lithium contained in the garnet-type oxide powder is larger than an equivalent amount required for garnet-type oxide.

* * * * *